United States Patent [19]

Persson et al.

[11] Patent Number: 4,575,039
[45] Date of Patent: Mar. 11, 1986

[54] APPARATUS FOR POSITIONING THE PLANE OF AN APPARATUS TABLE AT AN OPTIONAL INCLINATION

[75] Inventors: Nils A. Persson, Gothenburg; Torsten G. Lindberg, Öckerö, both of Sweden

[73] Assignee: Telefonaktiebolaget L M Ericsson, Stockholm, Sweden

[21] Appl. No.: 561,617

[22] Filed: Dec. 15, 1983

[30] Foreign Application Priority Data

Dec. 29, 1982 [SE] Sweden .............................. 8207491

[51] Int. Cl.[4] .......................................... F16M 13/00
[52] U.S. Cl. .................................... 248/550; 248/179
[58] Field of Search ............... 245/550, 652, 178, 179, 245/180, 184, 371; 343/765, 766, 882, DIG. 2; 74/5.47, 5.22; 318/625

[56] References Cited

U.S. PATENT DOCUMENTS

| | | | |
|---|---|---|---|
| 2,574,376 | 11/1951 | Childs et al. | 343/765 X |
| 2,726,834 | 12/1955 | Hoge | 248/180 |
| 3,018,992 | 1/1962 | Lore | 248/180 |
| 3,215,391 | 11/1965 | Storm | 248/179 X |
| 3,364,810 | 1/1968 | Hickerson | 248/180 X |
| 3,527,435 | 9/1970 | Lapp et al. | 343/882 X |
| 4,181,283 | 1/1980 | Rizzo | 248/550 |
| 4,360,182 | 11/1982 | Titus | 248/371 |

FOREIGN PATENT DOCUMENTS

| | | | |
|---|---|---|---|
| 6414146 | 6/1965 | Netherlands | 248/179 |
| 2595 | of 1910 | United Kingdom | 248/180 |

*Primary Examiner*—J. Franklin Foss
*Attorney, Agent, or Firm*—Roberts, Spiecens & Cohen

[57] ABSTRACT

In an apparatus for positioning the plane (33) of an apparatus table (8) at an optional inclination there are included two rotatable, wedge-shaped housings (4, 6), adapted for giving the plane (33) the selected inclination in a combination of angular rotations. For avoiding a point of singularity within the positioning range for the inclination, an angularity is introduced between the uppermost of the housings (6) and the plane (33).

3 Claims, 3 Drawing Figures

APPARATUS FOR POSITIONING THE PLANE OF AN APPARATUS TABLE AT AN OPTIONAL INCLINATION

FIELD OF THE INVENTION

The present invention relates to an apparatus for positioning the plane of an apparatus table at an optional inclination, in relation to a supporting substructure.

BACKGROUND

A radar antenna on a ship for and following military targets is often mounted on a table, also called a universal table, such that it can be kept in a horizontal position independent of movement of the ship. Known tables are suspended in a gimbal ring, and motors are provided for positioning the table, one motor for each of gimbal axis. At least one of the motors will thus accompany the table in its movement; the moving part of the mounting apparatus will therefore be heavy, resulting in many large, heavy trunnion pins and bearings.

One of the objects of the invention is to provide a positioning apparatus which is lighter than the known apparatus for the same task.

SUMMARY OF THE INVENTION

The apparatus in accordance with the invention for positioning a table contains two rotary wedges, known from SE-A No. 8002975-4. In order to prevent the table itself from accompanying the rotary wedges in their rotation, and for being solely positioned at the inclination determined by them the table is connected to the substructure, i.e., the deck of the ship, by a gimbal ring having two axes. Angular position transducers, known per se, are disposed at a trunnion pin of either axis and connected to a servo system, by which the rotary wedges are controlled in their rotation such that the table assumes the desired horizontal position.

However, the known apparatus with rotary wedges is not suitable to guide the table into a position parallel to the deck of the ship, this position being obtained for any setting at all of the rotary wedges, providing that their individual rotations nullify each other. Control of the rotary wedges will thus be indeterminate in this situation.

The difficulty is avoided with the apparatus in accordance with the invention by introducing an angularity into it. The angular stroke of the table is limited in relation to the deck by movement limitations on the trunnion pins of the gimbal ring, and it is ensured that the point of indeterminate regulation, i.e., the point of singularity, falls outside the desired range of movement of the table.

In a special embodiment of the apparatus the angularity is introduced immediately under the plane of the table.

BRIEF DESCRIPTION OF THE FIGURES OF THE DRAWING

An embodiment of an apparatus in accordance with the invention is described in the following, with reference to the accompanying drawing wherein.

DETAILED DESCRIPTION OF ONE EMBODIMENT OF THE INVENTION

The exemplifying apparatus in accordance with the invention described here is intended to be set up on the deck of a ship and to carry a radar antenna on the plane of the table positioned by the apparatus.

Figure 1:
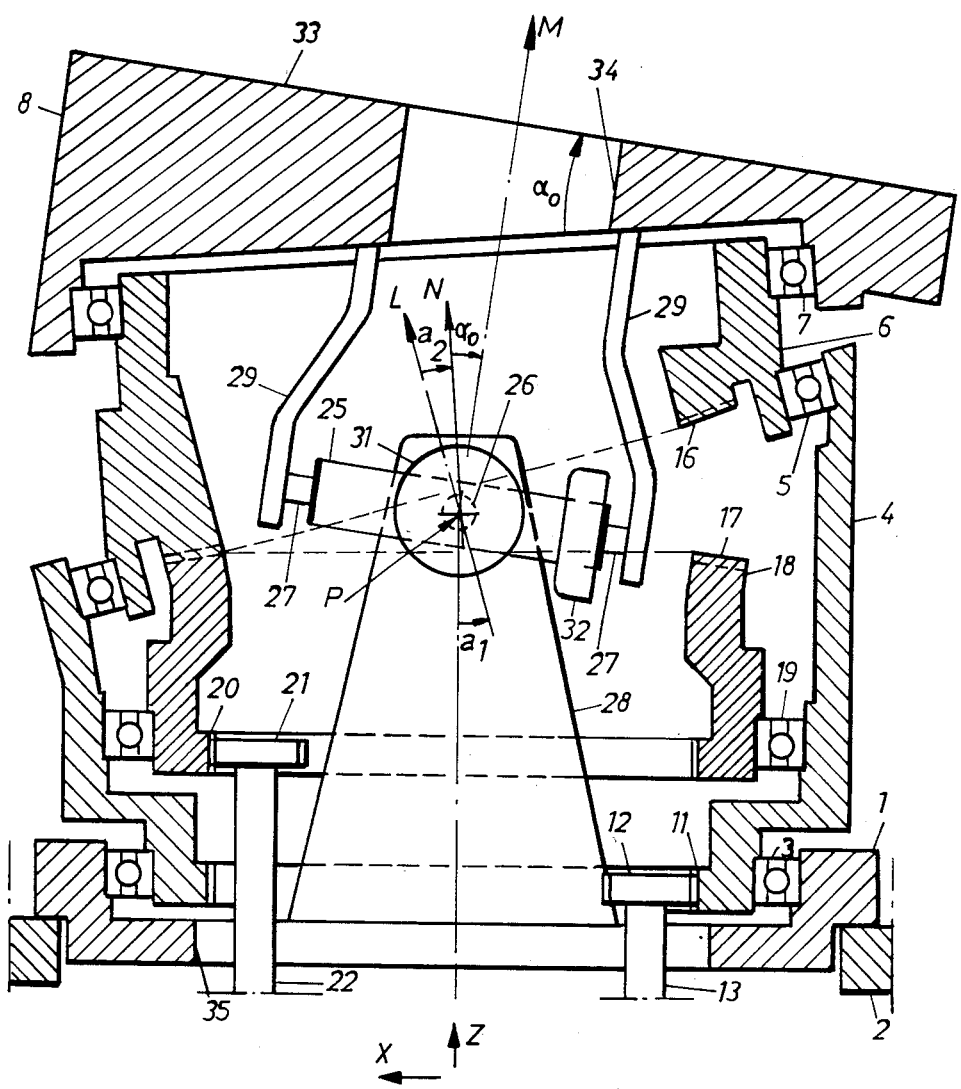
FIG. 1 is a longitudinal sectional view through the apparatus.

As will be seen from the longitudinal section in FIG. 1 the exemplifying apparatus comprises a fastening ring 1 fastened to a substructure 2, in this case the deck of the ship. A first circular housing 4 is rotatably mounted in a bearing 3 in the fastening ring, the rotational axis of the bearing in the example being parallel to a direction Z, normal to the substructure. The first housing 4 is provided with a second bearing 5 with a rotational axis L having a direction deviating from that of the first bearing. A second circular housing 6 is rotatably mounted in the second bearing 5, and the second housing is provided with a third bearing 7 having a rotational axis N deviating from that of the second bearing 5 having the rotational axis L. The third bearing 7 is disposed for carrying an apparatus table 8, which in this case is to serve as the attachment for a radar antenna, which in itself contains control means for training the antenna in a desired direction in space.

Figure 2:
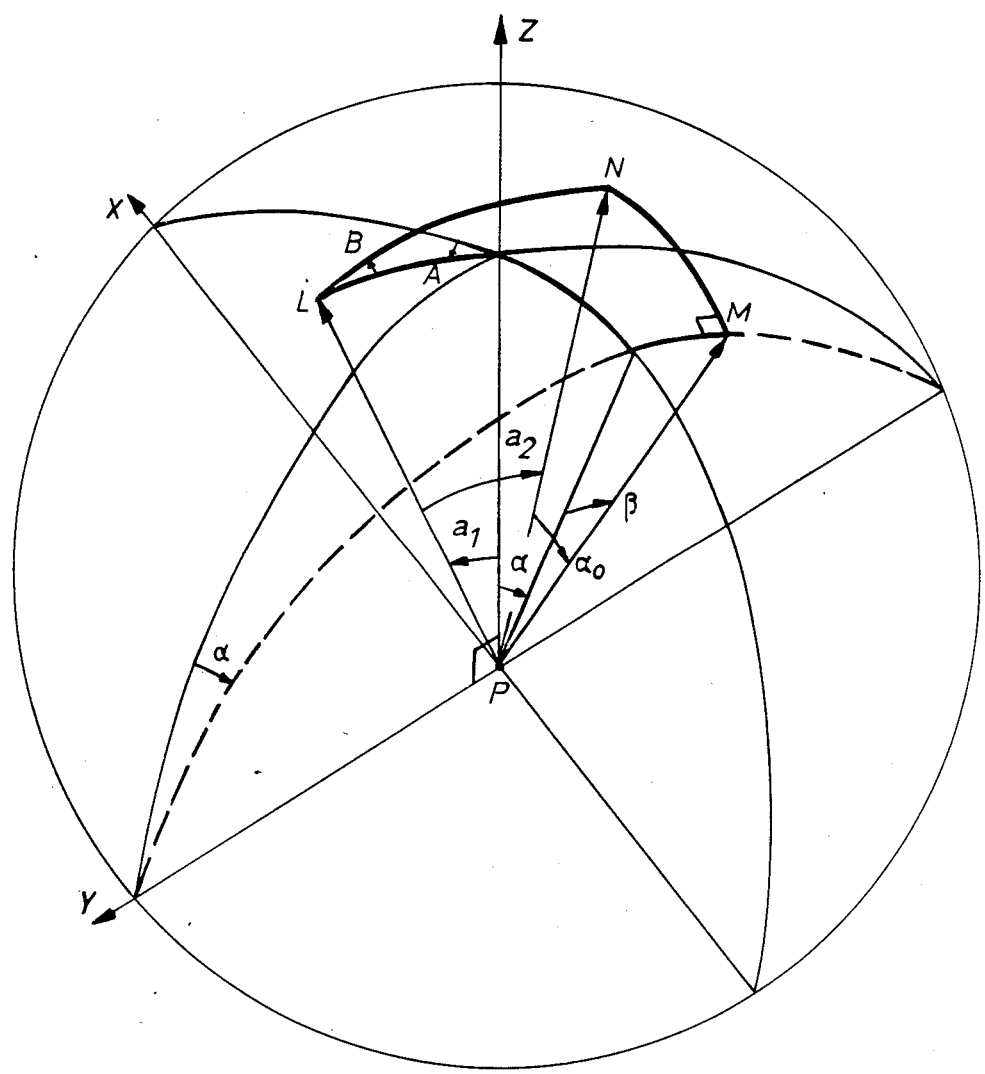
FIG. 2 illustrates directions indicated by parts of the apparatus, drawn on the surface of a hemisphere with the apparatus in the center and FIG. 3 diagrammatically illustrates the positioning range of the apparatus.

The rotational axis with the direction L of the second bearing 5 deviates, as will also be seen from FIG. 2, from the rotational axis Z of the first bearing 3 by an angle $a_1$. The rotational axis N of the third bearing 7 deviates from the rotational axis L of the second bearing by an angle $a_2$.

In the exemplifying apparatus, the angles $a_1$ and $a_2$ are the same, but in alternative apparatus the angles are different form each other.

By rotating both wedge-shaped housings 4, 6, also called rotary wedges, in their bearings it is possible to give the rotational axis N of the third bearing any direction at all in relation to the direction of the normal Z, within the limits of the positioning range of the apparatus.

The first housing 4 is provided with a gear ring 11 for rotation to the intended position. A pinion 12 is adapted for meshing with this gear ring. The pinion 12 is connected by means of a first drive shaft 13 to a first drive motor, not illustrated on the drawing, for positioning the first housing 4. The drive motor in the example is an electric motor, but in other applications it can be of some other type. The second housing 6 is provided with a bevel gear ring 16 meshing with a gear ring 17 on an intermediate ring 18 mounted in the first housing 4 through a bearing 19, the rotational axis of which coincides with the axis Z of the first bearing 3. The intermediate ring 18 is further provided with a gear ring 20 which meshes in the a second pinion 21. The pinion 21 is connected by a second drive shaft 22 to a second drive motor (not shown) for positioning the second housing 6, this drive motor being of the same kind as the drive motor for positioning the first housing 4.

The first housing 4 is rotated by its drive motor through the angle A in FIG. 2, reckoned from an initial direction, and the second housing 6 is rotated by its drive motor through the angle B, reckoned from the positioning direction of the first housing, or, expressed in different words, the angle A+B from the initial direction.

In alternative embodiments of the apparatus in accordance with the invention the rotation is translated from the intermediate ring 18 to the second wedge-shaped housing 6 by a gimbal mechanism, comprising a ring carrying two perpendicular shafts, one of which is connected to the housing 6 and the other to the intermediate ring 18.

This gimbal mechanism is not illustrated on the drawing. In such a case, the gimbal mechanism mentioned here replaces both gear rings 16, 17.

To prevent the apparatus table 8 following the rotation of the second housing 6 there is a gimbal ring 25 with two axes 26, 27 mutually at right angles arranged inside both wedge-shaped housings 4, 6. The first axis 26 has its trunnion pin mounted in two trunnion brackets attached to the fastening ring 1, one trunnion bracket 28 being visible in FIG. 1. The other gimbal axis 27 has its trunnion pins mounted in two trunnion brackets 29 fastened to the table 8.

In order to enable free and unobstructed rotation of all moving housings and the table and the trunnion pins, all the rotational axes intersect at a single point P at the center of the gimbal ring 25. The point P is the initial point in FIG. 2 for all the stated directions.

At each of the two gimbal axes there are angular position transducers 31, 32 of a kind known per se for electrically indicating the angular position of the trunnion pins. Both transducers are coupled to a servo system adapted for positioning, by the two drive motors already described, both wedge-shaped housings 4, 6 in the intended angular position, thereby to give the rotational axis N the intended direction.

For positioning the direction N parallel to the direction Z it is required that the angle B is zero, but the angle A for the first housing can then have any value at all, this value being indeterminate. The drive motor for positioning the angle A can therefore not be guided to assume a definite position, the direction Z having a so-called point of singularity. Directions in the vicinity of the direction Z are also difficult to position with the servo system, because the gear ratio from the drive motors to the indicated direction N in that area deviates substantially from the normal. There are thus good reasons for avoiding positioning the direction N in the vicinity of the direction Z.

In the apparatus in accordance with the invention, setting a direction in the vicinity of the point of singularity is avoided by the added angularity between the substructure 2 and the plane 33 of the table 8. In the described example, the angularity is inserted between the third bearing 7 with the rotational axis N and the plane 33 of the table with the normal direction M, the angularity being denoted by $\alpha_0$ in the figures.

In alternative embodiments of the apparatus in accordance with the invention, the critical point is avoided by giving an angularity to parts of the apparatus other than the table, e.g. by giving the attachment ring 1 an angularity, and also by giving angularity to several parts in one and the same apparatus.

The apparatus in the described example is intended to be set up on a ship and to compensate for the ship movements in its stamping direction and heeling direction, so that the plane 33 of the table is horizontal, independent of ship movements, i.e. the normal M to the plane vertical.

The conditions are illustrated by FIG. 2 where a plane defined by the axis X and Y is the ship's deck, the X axis being assumed directed towards the stern of the ship and the Y axis to starboard (to the right). The third axis Z is directed upwards from the deck at right-angles to it and can be said to give the direction of the ship's mast.

It will be seen from FIG. 2 that the rotational angle A of the wedge-shaped housing 4 is measured starting from the X-Z plane.

The vessel is equipped with a plumbing gyro, adapted for indicating verticality as the vessel stamps and heels. This gyro contains a direction indication part indicating verticality, and is suspended in a gimbal system with two perpendicular axes. One of these axes has its trunnion pins mounted in trunnions attached to the ship, and it is presumed that this axis is parallel to the Y axis in FIG. 2. Rotation about this axis gives the stamping angle of the ship, denoted in FIG. 2 by $\alpha$. Rotation about the other gimbal axis of the gyro gives the heeling angle of the vessel, denoted by $\beta$ in FIG. 2.

In the apparatus of the invention for positioning the plane 33 of the table, its gimbal ring 25 and gimbal axis 26, 27 as well as the angular position transducers 31, 32 are disposed such that the angles measured by the transducers have complete correspondence with the angles $\alpha$ and $\beta$ measured by the plumbing gyro. In order that this correspondence is obtained, the axis 26 of the apparatus connected to the vessel's deck shall be parallel to the axis of the plumbing gyro connected to the vessel's deck, the other axis 27 of the apparatus shall be parallel to the plane 33 of the table, and the indication of the transducer 31, this indication to be compared with the stamping angle $\alpha$, and the indication of the transducer 32, this indication to be compared to the heeling angle $\beta$, shall both be zero when the normal direction M of the plane coincides with the mast direction Z of the vessel.

By means of a servo system incorporating the transducers 31, 32 and the motors acting on the wedge-shaped housings 4, 6, the inclination of the plane 33 of the table is positioned such that its normal direction M coincides with the vertical indicated by the ship's plumbing gyro.

With the described apparatus in accordance with the invention, the plane 33 of the table is given the intended inclination in respect of the substructure 2, without the necessary calculation and rotation of each of the housings 4, 6 and.

Figure 3:
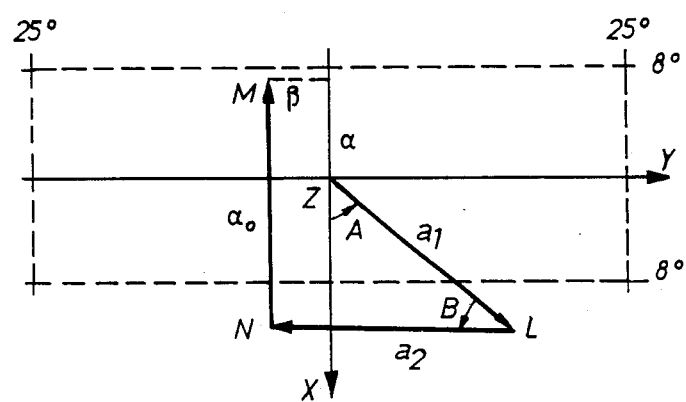

In the described example, the apparatus is adapted for compensating a stamping angle $\alpha$ of the vessel of 8° fore and aft, and a heeling angle $\beta$ of 25° to the left and right. The angular positionings $a_1$ and $a_2$ of the bearings in the housings 4, 6 are thereby set at 20° and the angularity $\alpha_0$ of the table is set at 18°. In apparatus with alternative embodiments, other values are selected for the angles. The direction M indicated by the normal to the platform 33 shall thus fall within the area enclosed by dashed lines in FIG. 3. With the angles selected in the described example, it is avoided that the direction N, indicated by the wedge-shaped housing 6 and situated in one example as indicated in the Figure, falls close to the direction Z representing the point of singularity in the apparatus.

With the special embodiment of the table where the gimbal ring 25 and transducers 31, 32 are enclosed in the rotatable housings 4, 6 there is achieved the particular advantage that the transducers are protected by the housings and by sealings at their bearing from water in inundating waves. A central hole 34 is made in the table 8 and a large opening 35 is made in the attachment ring 1. Cables intended for the apparatus set up on the table can be taken through the hole and openings and through the gimbal ring 25.

What is claimed is:

1. Apparatus for positioning the planar surface of a table at an optional inclination in relation to the plane of a substructure, said apparatus comprising an attachment ring for mounting the apparatus on a substructure, a first bearing in said attachment ring having a rotational axis, a rotatably mounted first housing in said bearing, a second bearing in said housing having a rotational axis deviating from that of the rotational axis of said first bearing, a second housing rotatably mounted in said second bearing, a third bearing on said second housing having a rotational axis deviating from that of said second bearing, a table supported by said third bearing and having a planar surface whose angular position is adjustable by a combination of angular rotations of both rotatable housings, a servo mechanism comprising a first motor for angularly positioning the first housing in said first bearing, and a second motor for angularly positioning the second housing in said second bearing, a gimbal ring having first and second axes of rotation and including angular position transducers at each axis for controlling said motors, means connecting the gimbal ring to the table for rotation around one of the axes parallel to said planar surface, and means connecting the gimbal ring to the attachment ring for rotation about the other of the axes parallel to the plane of said attachment ring, and means for avoiding a point of singularity within the positioning range of the inclination of said planar surface by the provision of an angularity between the plane of said substructure and the planar surface of the table.

2. Apparatus as claimed in claim 1, where said angularity is between the plane of said third bearing and the planar surface of the table.

3. Apparatus as claimed in claim 1, comprising a fourth bearing in said first housing, an intermediate ring rotatably mounted in said fourth bearing for rotation about an axis parallel to the axis of the first bearing, and bevel gear means on said intermediate ring and on said second housing for transmitting drive from said intermediate ring to said second housing.

* * * * *